United States Patent Office 3,448,107
Patented June 3, 1969

3,448,107
TETRAZOLE DERIVATIVES
Gerald F. Holland, Groton, Conn., assignor to Chas. Pfizer & Co., Inc., New York, N.Y., a corporation of Delaware
No Drawing. Filed Dec. 15, 1964, Ser. No. 418,526
Int. Cl. C07d 57/12, 57/24; A61k 25/00
U.S. Cl. 260—250        6 Claims

ABSTRACT OF THE DISCLOSURE

Novel 5-pyrazinyl, pyrimidinyl and pyridazinyl tetrazoles and N-oxides thereof useful as lipid regulating agents.

---

This invention relates generally to novel compounds which are effective in regulating lipid metabolism in humans. More particularly, it is concerned with novel 5-pyrazinyl, pyrimidinyl and pyridazinyl tetrazoles and N-oxides thereof, and their use as antilipemic agents.

What is meant by the term "regulating lipid metabolism" is the ability to depress triglycerides, free fatty acids, cholesterol, lipoproteins, phospholipids, etc. in human and animal blood.

The compounds of the present invention can be represented by the following structural formulas:

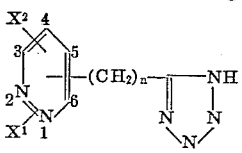
I

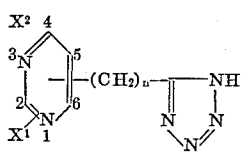
II

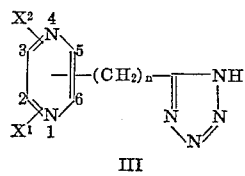
III wherein $X^1$ and $X^2$ are each selected from the group consisting of H, halogen (F, Cl, Br, I), hydroxy, amino, alkyloxy, alkylthio, mono- and dialkylamino, N-alkylcarbamyl, N,N-dialkylcarbamyl, alkylsulfoxy, alkylsulfonyl, said alkyl groups containing from 1 to 4 carbon atoms, trifluoromethyl, trifluoromethoxy, trifluoromethylthio, carboxy, carbamyl, alkanoyloxy containing up to 4 carbon atoms, phenyl, p-chlorophenyl, p-methylphenyl and p-aminophenyl; $n$ is a whole number from 0 to 4; one of $X^1$ and $X^2$ is other than H; and N-oxides thereof.

The numbering system for the diazine rings, as shown in Formulae I, II and III above, consists in selecting one nitrogen atom as the 1-position and labeling the remaining atoms consecutively in such a manner that the shortest route, numerically, is taken to the second nitrogen atom. It is obvious that for the 1,4-diazine ring system, i.e., pyrazine, the second nitrogen atom would be numbered as 4 regardless of the route taken because of its symmetry.

Specific examples of such compounds include 5-(6-pyrazinyl)tetrazole, 5-(6 - pyridazinyl)tetrazole, 5-(6-pyrimdinyl)tetrazole, 6-(5-tetrazoyl)pyrazine-N-oxide, and 5-[3-(5-butyl)pyridazinyl]tetrazole.

In accordance with the process for preparing these compounds, the appropriate cyanopyrazine, cyanopyrimidine, or cyanopyridazine compound is condensed with sodium azide and ammonium chloride in the presence of lithium chloride. The appropriate cyano compounds are either known compounds or can easily be synthesized employing standard organic procedures well known to those skilled in the art.

The condensation step itself is most desirably conducted in dimethylformamide at ambient temperatures. In general, a slight excess of sodium azide and ammonium chloride, and approximately 0.01% by weight of lithium chloride are used based on the cyano compound.

Recovery of the desired product from the reaction mixture is readily effected by any number of standard procedures known to those skilled in the art. For instance, the procedure employed for isolating the herein disclosed compounds is as follows: The reaction mixture is filtered to remove insoluble material and stripped free of solvent (DMF) under vacuum. The resulting residue is dissolved in a substantial amount of water, and the pH adjusted to about 4.0 with HCl solution. The precipitated product is filtered and a second crop is obtained from the mother liquor by adjusting the pH to about 2.0 and re-filtering. The product may be further purified by a recrystallization step wherein a suitable solvent, for example, water is utilized.

In addition to the procedure outlined above, several other synthetic routes are possible. For example, the corresponding derivatives may be obtained by heating a mixture of cyano compound, acetic acid, n-butanol and sodium azide for 5 days; or by heating a mixture of cyano compound with hydrazoic acid in xylene in a pyrex combustion tube.

Included within the class of compounds, represented by Formulas I, II and III are the corresponding N-oxides. The conversion of the diazine compounds of the invention to their respective mono N-oxides is effected in essentially the same manner one employs to convert pyridine or its derivatives to their respective pyridine N-oxides. The latter reaction generally consists of oxidizing the pyridine compound with a hydrogen peroxide solution in a suitable reaction medium, for example, glacial acetic acid. In a similar manner, the mono N-oxides of the 5-pyrazinyl, pyrimidinyl, and pyridazinyl tetrazoles of the present invention have been prepared. A procedure which has been found to be satisfactory is as follows: A mixture containing 5-pyrazinyl, pyridazinyl, or pyrimidinyl tetrazole compound, glacial acetic acid, and 30% hydrogen peroxide is heated for approximately 24 hours at a temperature from about 0° C. to about 100° C. The mixture is subsequently cooled, diluted with a large volume of ether, and the precipitated product is filtered. To purify further, said product may be crystallized from a suitable solvent, for example, water. Since the above compounds possess two nitrogens susceptible to attack, only a slight molar excess of hydrogen peroxide is utilized. Preferential attack is on one of the two nitrogens in the six-membered ring.

Since the compounds of this invention are amphoteric in nature, they can be converted to either acid or base addition salts by treating said compounds with a substantially equimolar amount of a chosen acid or base in an aqueous solution or in a suitable organic solvent such as methanol or ethanol. When such salts are to be used for human consumption, either orally or parenterally, the acids or bases which are used to prepare the pharmaceutically acceptable addition salts must, of course, be those which necessarily form non-toxic acid addition salts. Examples of acids which provide pharmaceutically acceptable anions are hydrochloric, hydrobromic, hydroiodic, nitric, sulfuric or sulfurous, phosphoric, acetic, lactic, citric, tartaric, oxalic, succinic, maleic, gluconic, and p-toluene sulfonic.

The bases which are used to prepare the pharmaceutically acceptable base salts of the tetrazoles of this invention are those which form nontoxic salts containing pharmaceutically-acceptable cations, such as the alkali metal, alkaline-earth metal, ammonium or water-soluble amine addition salts like the lower alkanol-ammonium and other base salts with organic amines which are compatible with the human system. Preferred members of this group include the sodium, potassium, magnesium, calcium and ethanol-ammonium salts.

The tetrazole derivatives and N-oxides thereof of this invention can be administered either alone or preferably in combination with a pharmaceutically acceptable inert carriers in the form of tablets, capsules, lozenges, troches, hard candies, powders, sprays, aqueous suspensions or solutions, injectable solutions, elixirs, syrups, and the like. Such carriers include solid diluents or fillers, sterile aqueous media and various non-toxic organic solvents. Moreover, the oral pharmaceutical compositions of this invention may be suitably sweetened and flavored by means of various agents of the type commonly employed for just such a process.

For purposes of parenteral administration, solutions or suspensions of the herein described tetrazole derivatives in sesame or peanut oil or in aqueous propylene glycol solutions can be employed, as well as sterile aqueous solutions of the corresponding water-soluble addition salts previously enumerated. These particular solutions are especially suited for intramuscular and subcutaneous injection purposes. The aqueous solutions, including those of the addition salts dissolved in pure distilled water, are additionally useful for intravenous injection purposes provided that their pH be properly adjusted before hand. Such solutions should also be suitably buffered, if necessary, and the liquid diluent first rendered isotonic with sufficient saline or glucose.

When administered to humans orally or parenterally, the effective average daily dose is suitably between 0.5 g. per day and about 3 g. per day. The dosage can be taken at one time or divided dosages can be taken at different times during the day. On a body-weight basis, a dosage of about 73 to about 440 mg./kg. per day is appropriate.

The physician will determine the dosage which will be most suitable for an individual patient and it will vary with the age, the weight and response of the particular patient. The above dosages are exemplary of the average host. There can, of course, be individual cases where higher or lower dosage ranges are merited, and such are within the scope of this invention.

The term lipids is used here in the broad sense, covering triglycerides, cholesterol, phospholipids and free fatty acids. It is generally accepted that abnormalities in lipid metabolism, frequently indicated by elevated blood lipid levels, are closely associated with atherosclerosis, with cardiovascular disease, and with derangements of carbohydrate metabolism, e.g. diabetes. Drugs which will lower lipid levels can therefore be expected to be useful in the treatment of these diseases, and of others in which lipid metabolism is is abnormal.

The verification that the herein disclosed tetrazole derivatives are effective lipid regulating agents is established by in vivo evaluation. The procedure for the in vivo evaluation which determines the time course of mobilization of free fatty acids is as follows: An intravenous dose of 10 mg./kg. of test compound is administered to 2 or more dogs. Blood samples are withdrawn for controls and at ½, 1 hour and hourly through an eight hour period. Plasma free fatty acid levels are measured and expressed as µ Eq. FFA/1 of plasma and results are tabulated in terms of per cent fall of free fatty acids.

The usefulness of the herein disclosed compounds may be also evident in other phases of abnormal lipid metabolism, the latter possibly accounting for the clinical problems in diabetes, pancreatitis, coronary heart disease, cerebrovascular disease, etc. Hence, the ability of tetrazoles of the instant invention to decrease or regulate lipid metabolism might find utility in the treatment of the above said diseases.

The following examples are provided by way of illustration and should not be interpreted as limiting the invention, many variations of which are possible without departing from the spirit or scope thereof.

EXAMPLE I 5-(6-pyrazinyl)tetrazole

A mixture of 6-cyanopyrazine (235 g., 2.24 M), sodium azide (195 g., 3.0 M), ammonium chloride (162 g., 3.0 M), lithium chloride (3.0 g.) and dry dimethylformamide (1500 ml.) is stirred for 42 hours. On completion of said period, insoluble material is filtered and the mother liquor stripped of dimethylformamide. To the resulting residue is added 4000 ml. of water and the pH adjusted to 4.0 with an HCl solution. The product 5-(2-pyrazinyl)tetrazole is obtained by filtration and a second crop is obtained by adjusting the pH of the filtrate to 2.0 and re-filtering. The combined crop yields a substantial amount of product, M.P. 180–182° C.

*Analysis.* Calcd. for $C_5H_4N_6$: C, 40.54%; H, 2.72%; N, 56.74%. Found: C, 40.43%; H, 3.08%; N, 56.23%.

EXAMPLE II 5-(6-pyrimidinyl)tetrazole

The procedure of Example I is repeated for the preparation of 5-(6-pyrimidinyl)tetrazole wherein a stoichiometric equivalent amount of 6-cyanopyrimidine is used in place of 6-cyanopyrazine and substantially the same results are obtained.

EXAMPLE III 5-(6-pyridazinyl)tetrazole

The procedure of Example I is repeated for the preparation of 5-(6-pyridazinyl)tetrazole wherein a stoichiometric equivalent amount of 6-cyanopyridazine is used in place of 6-cyanopyrazine and substantially the same results are obtained.

EXAMPLE IV

The procedure of Example I is repeated for the preparation of the following compounds wherein a stoichiometric equivalent amount of the appropriate cyano compound is used in place of 6-cyanopyrazine and the corresponding products are obtained in substantial amounts.

| Cyano compound | Product |
| --- | --- |
| 5-cyanopyridazine | 5-(5-pyridazinyl)tetrazole. |
| 5-cyanopyrimidine | 5-(5-pyrimidinyl)tetrazole. |
| 2-cyanopyrimidine | Do. |
| 3-amino-5-cyanopyridazine | 5-[5-(3-amino)pyridazinyl]-tetrazole. |
| 3,6-dichloro-5-cyanopyridazine | 5-[5-(3,6-dichloro)pyridazinyl]-tetrazole. |
| 5-methoxy-6-cyanopyridazine | 5-[6-(5-methoxy)pyridazinyl]-tetrazole. |
| 4-butyroxy-6-cyanopyridazine | 5-[6-(4-butyroxy)pyridazinyl]-tetrazole. |
| 4-p-methylphenyl-6-cyano-pyridazine | 5-[6-(4-p-methylphenyl)-pyridazinyl]tetrazole. |
| 2-methylthio-5-cyanopyrimidine | 5-[5-(2-methylthio)pyrimidinyl]-tetrazole. |
| 2-p-chlorophenyl-5-cyano-pyrimidine. | 5-[5-(2-p-chlorophenyl)-pyrimidinyl]tetrazole. |
| 4-phenyl-6-cyanopyrimidine | 5-[6-(4-phenyl)pyrimidinyl]-tetrazole. |
| 4-iodo-6-cyanopyrimidine | 5-[6-(4-iodo)pyrimidinyl]tetrazole. |
| 2,3-dipropylamino-6-cyanopyrazine | 5-[6-(2,3-dipropylamino)pyrazinyl]tetrazole. |
| 2-hydroxy-5-cyanopyrazine | 5-[5-(2-hydroxy)pyrazinyl]-tetrazole. |
| 3-methylsulfonyl-5-cyanopyrazine | 5-[5-(3-methylsulfonyl)pyrazinyl]-tetrazole. |
| 3-methylsulfoxy-5-cyanopyrazine | 5-[5-(3-methylsulfoxy)pyrazinyl]-tetrazole. |
| 3-methylamino-6-cyanopyridazine | 5-[6-(3-methylamino)pyridazinyl]-tetrazole. |
| 4-N,N-dimethylcarbamyl-6-cyanopyridazine. | 5-[6-(4-N,N-dimethylcarbamyl)-pyridazinyl]tetrazole. |
| 3-trifluoromethyl-5-cyano-pyridazine | 5-[5-(3-trifluoromethyl)-pyridazinyl]tetrazole. |
| 5-butylcarbamyl-2-cyano-pyrimidine. | 5-[2-(5-butylcarbamyl)-pyrimidinyl]tetrazole. |
| 6-carboxy-2-cyanopyrimidine | 5-[2-(6-carboxy)pyrimidinyl]-tetrazole. |
| 5-p-chlorophenyl-2-cyano-pyrimidine. | 5-[2-(5-p-chlorophenyl)-pyrimidinyl]tetrazole. |
| 4,5-diacetoxy-2-cyanopyrimidine | 5-[2-(4,5-diacetoxy)pyrimidinyl]-tetrazole. |
| 4-p-methylphenyl-2-cyano-pyrimidine. | 5-[2-(4-p-methylphenyl)-pyrimidinyl]tetrazole. |
| 2-butylamino-6-cyanopyrimidine | 5-[6-(2-butylamino)pyrimidinyl]-tetrazole. |

| Cyano compound | Product |
|---|---|
| 2,3-dibromo-6-cyanopyrazine | 5-[6-(2,3-dibromo)pyrazinyl]-tetrazole. |
| 2-fluoro-5-cyanopyrazine | 5-[5-(2-fluoro)pyrazinyl]tetrazole. |
| 2-trifluoromethoxy-6-cyanopyrazine | 5-[6-(2-trifluoromethoxy)-pyrazinyl]tetrazole. |
| 4-p-aminophenyl-6-cyanopyridazine | 5-[6-(4-p-aminophenyl)-pyridazinyl]tetrazole. |
| 4-phenyl-6-cyanopyridazine | 5-[6-(4-phenyl)pyridazinyl]-tetrazole. |
| 4-N,N-dibutylcarbamyl-6-cyanopyridazine | 5-[6-(4-N,N-dibutylcarbamyl)-pyridazinyl]tetrazole. |
| 3-N-ethylcarbamyl-5-cyano-pyrazine | 5-[5-(3-N-ethylcarbamyl)-pyrazinyl]tetrazole. |
| 4-trifluoromethylthio-6-cyano-pyridazine | 5-[6-(4-trifluoromethylthio)-pyridazinyl]tetrazole. |
| 5-pyridazinylacetonitrile | 5-(5-pyridazinylmethyl)tetrazole. |
| 6-pyridazinylvaleronitrile | 5-(6-pyridazinylbutyl)tetrazole. |
| 2-pyrimidinylproprionitrile | 5-(2-pyrimidinylethyl)tetrazole. |
| 6-pyrimidinylbutyronitrile | 5-(6-pyrimidinylpropyl)tetrazole. |
| 5-pyrimidinylacetonitrile | 5-(5-pyrimidinylmethyl)tetrazole. |
| 6-pyrazinylbutyronitrile | 5-(6-pyrazinylpropyl)tetrazole. |
| 3-butoxy-5-pyridazinylproprionitrile | 5-[5-(3-butoxy)pyridazinylethyl]-tetrazole. |
| 4-butylthio-6-pyridazinylacetonitrile | 5-[6-(4-butylthio)pyridazinyl-methyl]tetrazole. |
| 5-N,N-dibutylamino-2-pyrimidinyl-propionitrile | 5-[2-(5-N,N-dibutylamino)-pyrimidinylethyl]tetrazole. |
| 4-N,N-dibutylcarbamyl-6-pyrimidinylbutyronitrile | 5-[6-(4-N,N-dibutylcarbamyl)-pyrimidinylbutyl]tetrazole. |
| 3-butylsulfonyl-6-pyrazinylacetonitrile | 5-[6-(3-butylsulfonyl)pyrazinyl-methyl]tetrazole. |
| 3-methylcarbamyl-5-pyridazinyl-acetonitrile | 5-(5-(3-methylcarbamyl)pyrida-zinylmethyl)tetrazole. |
| 3-chloro-4-amino-6-pyridazinyl-proprionitrile | 5-[6-(3-chloro-4-amino)pyrida-zinylethyl]tetrazole. |
| 3,4-dipropyl-5-cyanopyridazine | 5-[5-(3,4-dipropyl)pyridazinyl]-tetrazole. |
| 5-carboxy-6-cyanopyrimidine | 5-[6-(5-carboxy)-pyrimidinyl]-tetrazole. |
| 2-bromo-5-cyanopyrimidine | 5-[5-(2-bromo)-pyrimidinyl]-tetrazole. |
| 2-butyl-4-methoxy-6-pyrimidinyl-butyronitrile | 5-[6-(2-butyl-4-methoxy)pyrimi-dinylpropyl]tetrazole. |
| 2-hydroxy-5-pyrimidinylvalero-nitrile | 5-[5-(2-hydroxy)pyrimidinyl-butyl]tetrazole. |
| 3,5-diacetoxy-6-cyanopyrazine | 5-[6-(3,5-diacetoxy)pyrazinyl]-tetrazole. |

EXAMPLE V

6-(5-tetrazoyl)pyrazine-N-oxide

A mixture of 5-(6-pyrazinyl)tetrazole (37.0 g. 0.25 M), glacial acetic acid (200 ml.) and 30% hydrogen peroxide (30 ml.) is heated at 90° C. for 24 hours. After this time period, the reaction mixture is cooled and diluted with a large volume of ether. The precipitate, 6-(5-tetrazoyl) pyrazine-N-oxide, which forms is filtered and recrystallized from water to give a substantial amount of product.

EXAMPLE VI

6-(5-tetrazoyl)pyrimidine-N-oxide

The procedure of Example V is repeated for the preparation of 6-(5-tetrazoyl)pyrimidine-N-oxide with comparable results.

EXAMPLE VII

6-(5-tetrazoyl)pyridazine-N-oxide

The procedure of Example V is repeated for the preparation of 6-(5-tetrazoyl)pyridazine-N-oxide with comparable results.

EXAMPLE VIII

The N-oxides of the compounds tabulated in Example IV are prepared following the procedure described in Example V with comparable results.

EXAMPLE IX

The class of compounds disclosed herein may be converted to their acid addition salts by the following general procedure: To a methanolic solution containing the diazine compound (1 M) is added a stoichiometric equivalent amount of a suitable acid. The resulting solution is subsequently stripped free of solvent and the precipitate, acid addition salt, is filtered and dried. Other suitable solvents, for example, ethanol, water or mixtures thereof may be utilized. The following acid addition salts are typical examples prepared using the above said procedure and substantial yields of product are obtained.

| Diazine Compound | Acid | Acid Addition Salt |
|---|---|---|
| 5-(6-pyrazinyl)-tetrazole. | HCl | 5-(6-pyrazinyl)tetrazole hydrochloride. |
| 5-(6-pyrimidinyl)-tetrazole. | HBr | 5-(6-pyrimidinyl)tetrazole hydrobromide. |
| 5-(6-pyridazinyl)-tetrazole. | HI | 5-(6-pyridazinyl)tetrazole hydroiodide. |
| 6-(5-tetrazoyl)-pyrazine-N-oxide. | Acetic acid | 6-(5-tetrazoyl)pyrazine-N-oxide acetate. |
| 6-(5-tetrazoyl)-pyrimidine-N-oxide. | Phosphoric acid | 6-(5-tetrazoyl)pyrimidine-N-oxide phosphate. |

EXAMPLE X

The hydrochloride, hydrobromide, and hydroiodide acid addition salts of those compounds enumerated in Example IV and mono N-oxides thereof are prepared following the procedure of Example IX with comparable results.

EXAMPLE XI

The class of compounds disclosed herein may be converted to their base addition salts by the following general procedure: To a water solution containing the diazine compound (1 M) is added a stoichiometric equivalent amount of a suitable base. The resulting solution is subsequently stripped free of solvent and the precipitate, base addition salt, is filtered and dried. The following base addition salts are typical examples prepared using the above described procedure and substantial yields of product are obtained:

| Diazine Compound | Base | Base Addition Salt |
|---|---|---|
| 5-(6-pyrazinyl)tetrazole. | NaOH | Sodium salt of 5-(6-pyrazinyl)tetrazole. |
| 5-(6-pyrimidinyl)tetrazole. | KOH | Potassium salt of 5-(6-pyrimidinyl)tetrazole. |
| 5-(6-pyridazinyl)tetrazole. | Ca(OH)$_2$ | Calcium salt of 5-(6-pyridazinyl)tetrazole. |
| 6-(5-tetrazoyl)pyrazine-N-oxide. | Mg(OH)$_2$ | Magnesium salt of 6-(5-tetrazoyl)pyrazine-N-oxide. |
| 6-(5-tetrazoyl)pyrimidine-N-oxide. | Ammonium hydroxide. | Ammonium salt of 6-(5-tetrazoyl)pyrimidine-N-oxide. |
| 6-(5-tetrazoyl)pyridazine-N-oxide. | Mono ethanolamine. | Mono ethanolamine salt of 6-(5-tetrazoyl)pyridazine-N-oxide. |

EXAMPLE XII

The sodium, potassium, calcuim, magnesium and ammonium salts of those compounds enumerated in Example IV and mono N-oxides thereof are prepared following the procedure of Example XI with comparable results.

EXAMPLE XIII

The following pharmacological test procedure is used to measure the hypolipemic effects (in vivo assay) of 5-(6-pyrazinyl)tetrazole. An intravenous dose of 10 mg./kg. of test compound is administered to 2 or more dogs and blood samples are withdrawn periodically. Plasma free fatty acid levels are measured and results are expressed as percent fall of free fatty acids.

Compound _____ 5-(6-pyrazinyl)tetrazole
Percent maximum fall of free fatty acids _____ 60%

Thus, the ability of 5-(6-pyrazinyl)tetrazole to effectively lower free fatty acid levels is clearly indicated.

EXAMPLE XIV 5-(6-pyrimidinyl)tetrazole, 5-(6-pyridazinyl)tetrazole, those compounds enumerated in Example IV, and the corresponding N-oxides thereof are evaluated in the test procedure outlined in Example XIII and experimental results indicates them to be effective antilipemic agents.

What is claimed is:
1. A compound selected from the group consisting of those of the formulas:

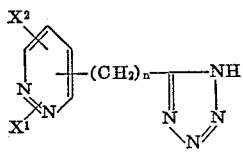 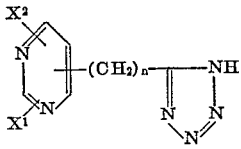

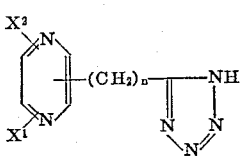

wherein $X^1$ and $X^2$ are each selected from the group consisting of H, halogen, hydroxy, amino, alkyloxy, alkylthio, mono- and dialkylamino, N-alkylcarbamyl, N,N-dialkylcarbamyl, alkylsulfoxy, alkylsufony, said alky groups containing from 1 to 4 carbon atoms, trifluoromethyl, trifluoromethoxy, trifluoromethylthio, carboxy, carbamyl, alkanoyloxy containing up to 4 carbon atoms, phenyl, p-chlorophenyl, p-methylphenyl and p-aminophenyl; $n$ is a whole number from 0 to 4; one of $X^1$ and $X^2$ is other than H; and the N-oxides thereof.

2. The pharmaceutically acceptable addition salts of a compound selected from the group consisting of those of the formulas:

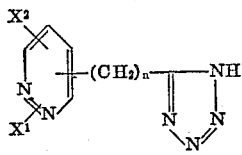 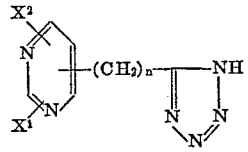

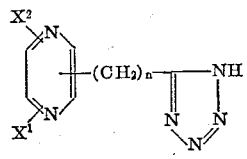

wherein $X^1$ and $X^2$ are each selected from the group consisting of H, halogen, hydoxy, amino, alkyloxy, alkylthio, mono- and dialkylamino, N-alkylcarbamyl, N,N-dialkylcarbamyl, alkylsulfoxy, alkylsulfonyl, said alkyl groups containing from 1 to 4 carbon atoms, trifluoromethyl, trifluoromethoxy, trifluoromethylthio, carboxy, carbamyl, alkanolyoxy containing up to 4 carbon atoms, phenyl, p-chlorophenyl p-methylphenyl and p-aminophenyl; $n$ is a whole number from 0 to 4; one of $X^1$ and $X^2$ is other than H; and the N-oxides thereof.

3. 5-[5-(3,6-dichloro)pyridazinyl]tetrazole.
4. 5-[5-(3-trifluoromethyl)pyridazinyl]tetrazole.
5. 5-[5-(2-fluoro)pyrazinyl]tetrazole.
6. 5-[6-(2-trifluoromethoxy)pyrazinyl]tetrazole.

References Cited
UNITED STATES PATENTS 2,852,515   9/1958   Elpern _____ 260—308.4

NICHOLAS S. RIZZO, *Primary Examiner.*

U.S. Cl. X.R.

260—308, 256.4; 424—250, 251